G. Mallory.

Hoop Skirt.

No. 1276

Reissued Feb. 18, 1862.

UNITED STATES PATENT OFFICE.

GEORGE MALLORY, OF WATERTOWN, CONNECTICUT.

IMPROVEMENT IN HOOP-SKIRTS.

Specification forming part of Letters Patent No. 21,839, dated October 19, 1858; Reissue No. 1,276, dated February 18, 1862.

*To all whom it may concern:*

Be it known that I, GEORGE MALLORY, of Watertown, in the county of Litchfield and State of Connecticut, have invented a new and useful Improvement in Hoop-Skirts; and I do hereby declare that the following is a full, clear, and exact description of the same, reference being had to the accompanying drawings, forming part of this specification, in which—

Figure 1:
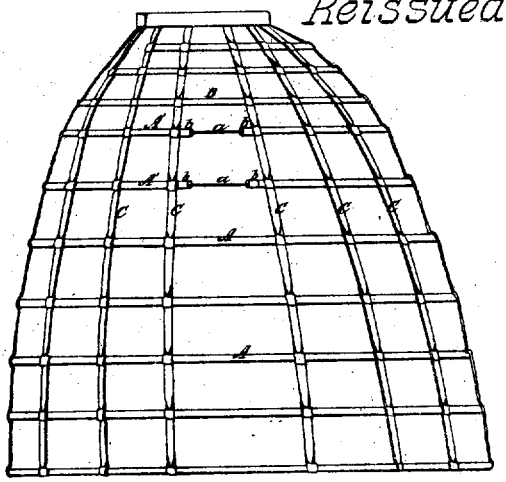
Figure 3:
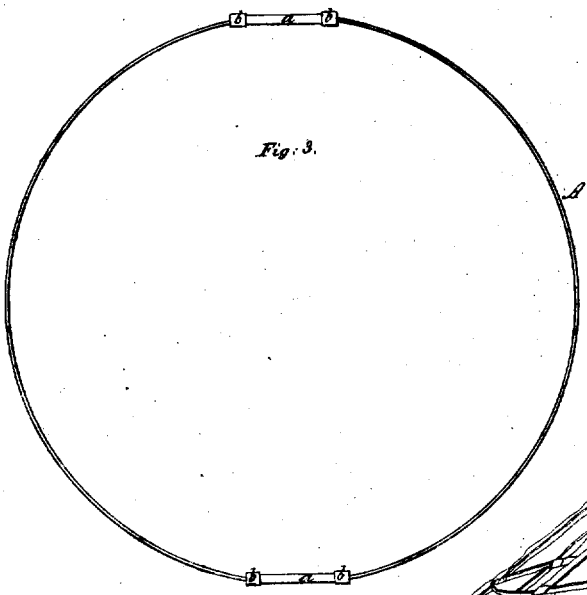
Figure 2:
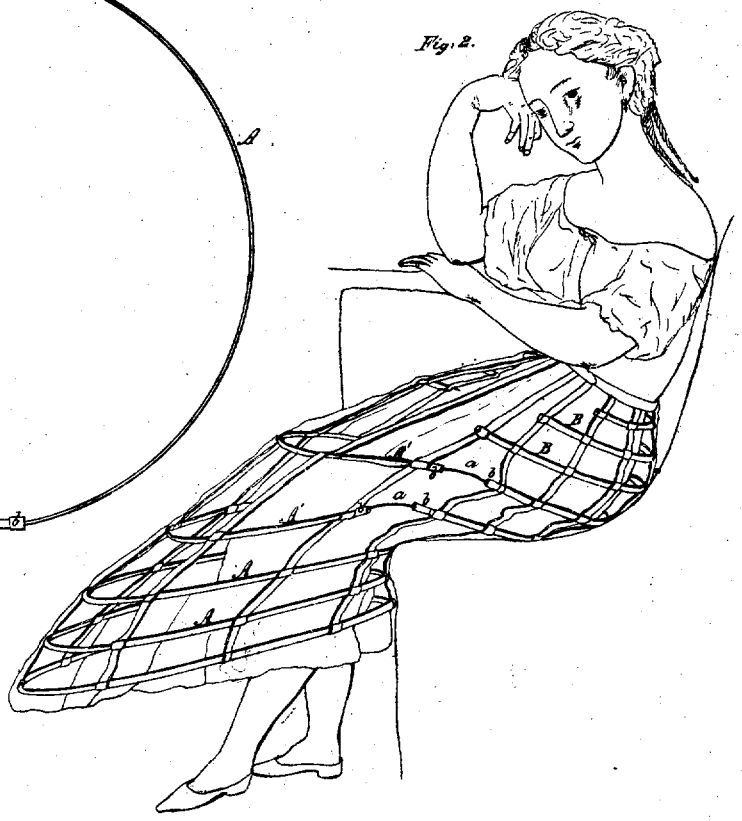

Figure 1 is a side view of a skirt with my improvement, representing it as it appears when the wearer stands up. Fig. 2 is a side view representing the skirt as it appears when the wearer sits down. Fig. 3 is a plan of one of the hoops.

Similar letters of reference indicate corresponding parts in the several figures.

This invention is intended to remedy a great defect which has existed in all the skirts previously manufactured with hoops of metal. Owing to the inflexibility of such hoops in an upward and downward direction, the front part of those hoops whose back parts are sat upon when the wearer sits down are thrown upward and caused to raise the front of the dress in an objectionable manner.

My invention consists in so constructing one or more of the hoops of a skirt that, while a desirable degree of inflexibility in an upward and downward direction is preserved in all other parts of the said hoops, they are made capable of an easy flexure in such direction at convenient points on each side, to enable their front parts to fall and hang over the front of the seat when the wearer is sitting.

A A A′ A′ B B in the drawings are the hoops of the skirt, and C C the connecting or suspending tapes. The lower hoops, A A, and the upper ones, B B, are represented of ordinary construction—that is to say, of thin strips of steel, which, when bent into form and in place in the skirt, have their width in a vertical direction, and are flexible and elastic in a horizontal direction, but not materially so in a vertical direction. The hoops A′ A′, which are likely to be sat upon, are made in the same way, except that at each side a short piece is cut out or omitted and the space filled by a piece, *a*, of well-tempered flat steel spring, sat with its edges transverse to the edges of the other parts of the hoop, or, in other words, with its width in a horizontal direction. The pieces *a a* are represented as united with the other parts of the hoops by the insertion of the ends of the said pieces and those of the other parts into slits cut transversely to each other in opposite ends of small blocks *b b*, of brass or other metal, and the soldering of the said ends therein. The hoops thus constructed retain their circular form, and, except at the pieces *a a*, are as inflexible in upward and downward directions as ordinary hoops; but in the pieces *a a* they are capable of being bent, as shown in Fig. 2, by the weight of the front parts in such manner as to allow the latter to fall down over the edge of a seat when the back parts are secured to the seat by being sat upon. This flexure of the hoops will be aided by the weight of the dress outside of them. When the wearer stands up again, the hoop resumes its proper shape and horizontal condition.

A cheaper method of constructing the hoops to provide for their flexure would be to have each hoop made of a single piece of steel, and to twist a portion on each side of it to the same position as *a a* relatively to the remainder of it, and this I regard as the equivalent to the insertion of a piece, *a*, as the portion so twisted will, like the pieces *a a*, permit the hoops to bend over the edge of a seat in a manner equivalent to what would be permitted by the introduction of hinges in the corresponding portions of the hoops.

I do not confine myself to any particular construction of the vertically flexible portions of the hoops; but

What I claim as my invention, and desire to secure by Letters Patent, is—

Provididing for the vertical flexure of one or more of the hoops of a skirt at the sides thereof by means of flexible pieces or their equivalents, operating substantially as and for the purpose herein specified.

GEORGE MALLORY.

Witnesses:

JOHN DE FOREST,

AUGUSTINE HOTCHKISS.